Figure 2:
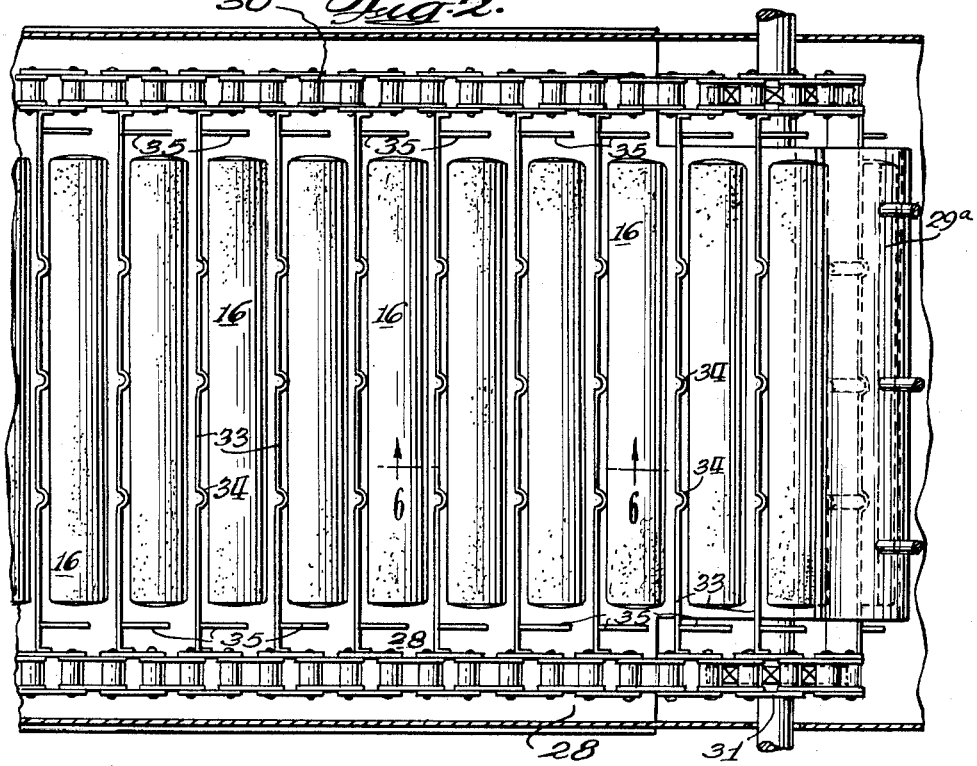

Sept. 22, 1964   A. C. GRETLER ETAL   3,149,980
PREPARATION OF SAUSAGE
Filed Oct. 24, 1960   4 Sheets-Sheet 1
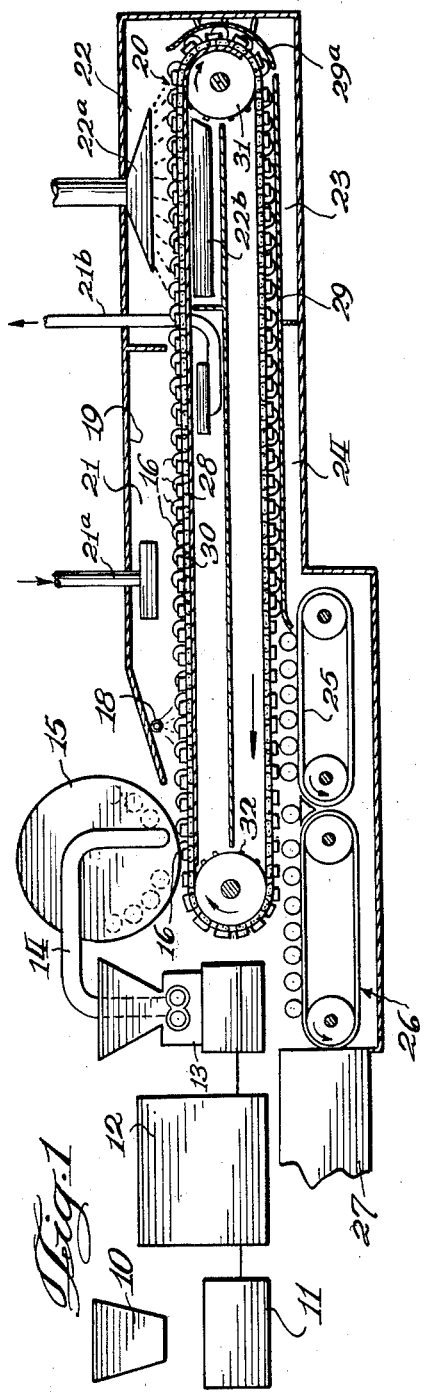
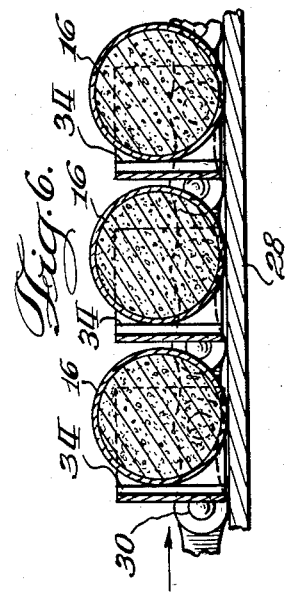
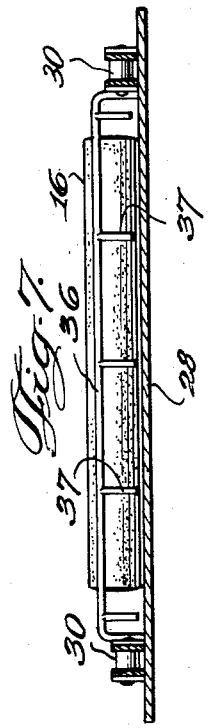
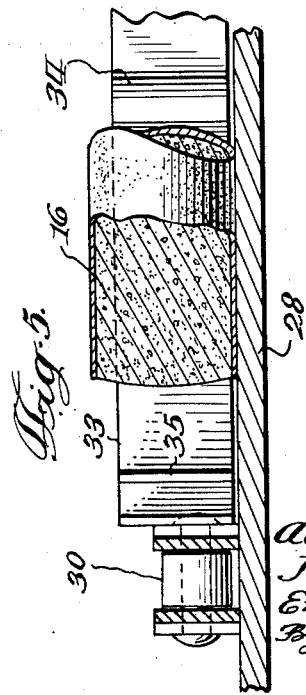
Inventors
Albert C. Gretler
Joseph C. Wilcox
Erwin W. Hopkins
By Carl C. Batz
Attorney

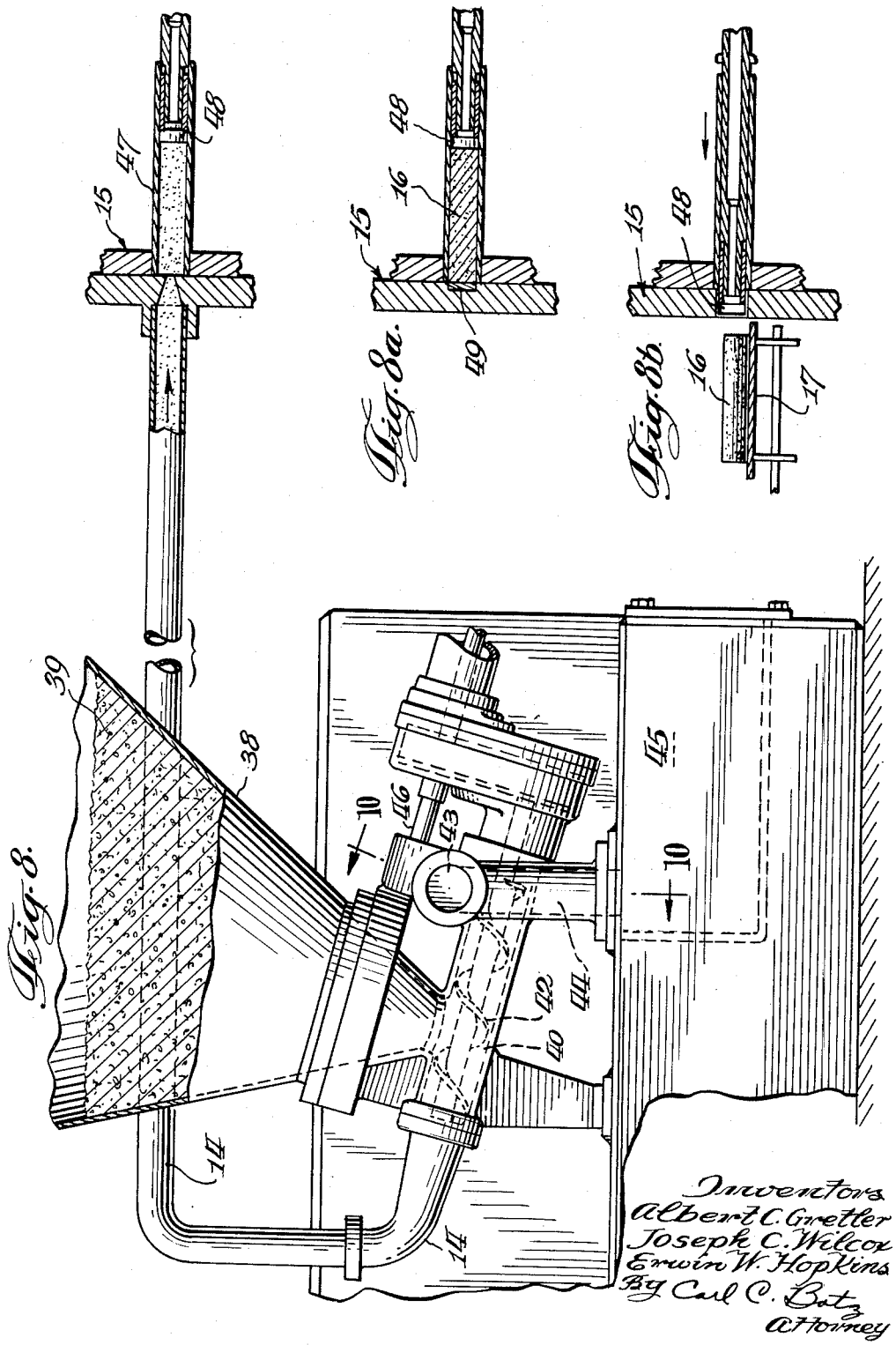

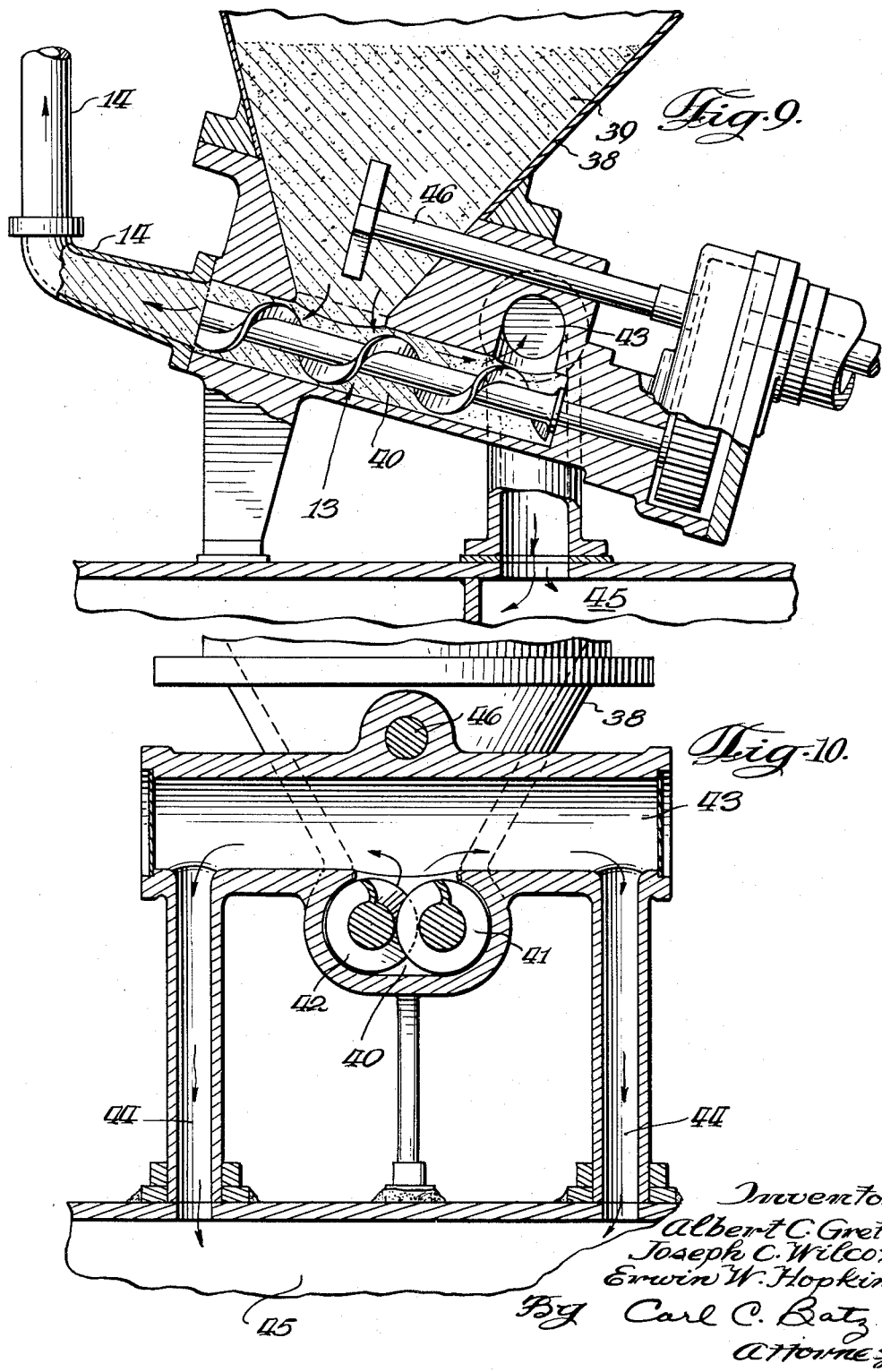

United States Patent Office 3,149,980
Patented Sept. 22, 1964

3,149,980
PREPARATION OF SAUSAGE
Albert C. Gretler, Downers Grove, Joseph C. Wilcox, Park Forest, and Erwin W. Hopkins, Hinsdale, Ill., assignors, by mesne assignments, to Armour and Company, a corporation of Delaware
Filed Oct. 24, 1960, Ser. No. 64,404
3 Claims. (Cl. 99—109)

This invention relates to the preparation of casingless sausage. More particularly this invention relates to a method of imparting resilient and selfsustaining properties to the surface of meat products produced in an automatic and continuous process wherein a unit mass of a comminuted meat mixture is subjected to rapid internal heating by means of passing an electric current therethrough.

This application is a continuation-in-part of our copending application Serial No. 851,947, filed November 10, 1959, now Patent No. 3,068,104.

Conventional methods of making skinless sausages, particularly those of the frankfurter type, have involved placing a comminuted meat mixture into artificial casings after which the encased meat mixture is cooked, generally by heated air. Following cooking, the artificial casing is removed by mechanical means, resulting in a final product having an outer layer that simulates the appearance of an encased product.

Other methods have attempted to eliminate the costs incurred in connection with methods using artificial casings by using molds. The molds, which are usually made of metal, are filled with a sausage mixture and then submerged in a hot water bath, where cooking occurs. A thin crust is thus formed on the areas of the sausage in contact with the mold wall which has the appearance of a membrane. A significant disadvantage in this method resides in the fact that as cooking takes place in the mold, the crust adheres to the walls of the mold. Upon expulsion from the mold, the adhering crust of the sausage is broken, resulting in a rough, uneven and unattractive surface, as well as requiring large quantities of molds, with the necessary washing, handling and maintenance of the same.

The meat industry has recognized that conventional methods of producing skinless sausages are slow and costly. This has led to the development of methods for producing rapidly cooked skinless sausage products. To achieve this end, electrical heating has been used. In one method utilizing an electrical current as a source of heat, a procedure very much like that used in conventional artificial casing methods is employed. The sausage mixture is placed in a casing, electrically heated to coagulate the meat proteins and then directed to a plow or knife which slits the casing and frees the cooked sausage. Although this is a fastener method than the conventional method, it requires, in addition to the highly specialized electrical heating apparatus, substantially similar casing removal equipment and the same costly casing material.

In still another method employing electrical heating, the sausage mixture is placed in a mold and heated by electrical current to a temperature insufficient to cook the meat. Following expulsion from the mold, the uncooked sausage is subjected to a cooking operation which takes substantially as long a period of time as is required in conventional methods. It is during this final cooking step that a membrane is formed on the sausage. However, due to the fact that an uncooked sausage is being treated at this point in the operation, the surface of the uncooked sausage is suscepible to damage which often results in a final product having a non-uniform and broken outer crust.

We have discovered a method of imparting resilient properties to the surface of skinless sausage products which not only materially reduces the time, amount of equipment and costs involved with methods heretofore used, but yields a product having a uniformly smooth, even and attractive appearance.

Accordingly, an object of this invention is to provide a method of manufacturing skinless sausages and the like utilizing rapid internal heating such as is accomplished by the passage of an electric current through the sausage mixture which yields casingless sausage having smooth, tender yet firm, and attractive surface characteristics that represent a substantial improvement over conventional skinless sausage products while eliminating the inherent disadvantages encountered in conventional skinless sausage manufacturing methods.

We have for a further object the provision of a method of manufacturing skinless sausages and the like utilizing rapid internal heating procedures which substantially reduces the time, amount of equipment and costs incurred in imparting resilient surface characteristics to casingless sausage products.

Further objects of the invention will appear from the more detailed description of this invention hereinafter set forth.

A satisfactory method which embodies our invention involves extruding a properly prepared meat mixture into a chamber or mold, subjecting the unit mass of meat mixture to rapid internal heating by passing an electrical current through the mixture to coagulate the proteins and to cook the meat mixture while preventing dehydration of the surface of the unit mass, ejecting the cooked meat mixture from the chamber or mold without disturbing the surface characteristics of the mixture, and subjecting the thus cooked unit mass of meat mixture to a current of heated air while the unit mass is being rotated, whereby the surface of the unit mass of sausage mixture is dehydrated to form a thin, integral crust or coating having resilient properties.

By the phrase "internal heating," we mean the substantially simultaneous heating by electrical resistance of the whole of a unit mass of a sausage meat mixture to a temperature sufficient to coagulate meat proteins and to cook the meat.

The meat mixture employed in connection with the method of this invention preferably is prepared in accordance with the method described in our copending application, Serial No. 846,795, filed October 16, 1959, now abandoned. The method of that application involves placing a suitable meat mixture into a standard meat comminuter. Ice and the necessary salts and cure may then be added and the comminuted sausage mixture subjected to further mixing and blending. A chilling operation follows, after which, in the preferred practice, the chilled comminuted meat mixture is mechanically mixed under vacuum. The meat mixture is then tempered and made ready for extrusion into a mold. Under certain possible conditions, the chilling and tempering operations may be omitted.

This conditioning procedure is particularly suitable for rapid internal heating procedures wherein an alternating electrical current is passed through the sausage mixture to coagulate proteins and to cook the meat. The conditioning operation briefly outlined above in some way affects the physical and chemical properties of the meat. The explanation of the manner in which these changes are brought about by this method of treating the meat is not clear, but it has been observed that it does have a pronounced effect on the finally cooked product.

In accordance with the preferred practice of this invention, a unit mass of the meat mixture conditioned in the manner described is extruded into a chamber or mold. Sufficient pressure is applied during the extrusion operation to render the mixture substantially free of voids. If air pockets are present, cooking will not be uniform and an unacceptable product will result. The extrusion process is continued until the limits of the mold cavity correspond to the desired shape, size and weight of the sausage being manufactured. In the case of frankfurters, the mold is of a cylindrical shape.

The mold is preferably made of a material which presents a smooth, substantially water and air-impervious surface to the compacted sausage mixture. Since electrical resistance heating methods are employed in this invention, it is preferred that the mold be made of some suitable non-electrical-conductive material. Teflon, aluminum silicate, and nylon are satisfactory.

For reasons not satisfactorily explainable by us, we have found that the development of desired surface characteristics in the cooked sausage mixture is achieved when the temperature of the mold is in a range not substantially different from that of the sausage mixture placed therein. This temperature range is from about 30° F. to about 90° F., and may be controlled by spraying cooled water into the mold cavity prior to extruding the sausage mixture into it. A water jacket on the mold or other suitable temperature-regulating means may also be employed for this purpose.

Compatibility between the temperature of the sausage mixture and the mold, in addition to having a desirable effect on the surface characteristics of the cooked product, also serves to maintain the conditioned sausage mixture in a state ready for cooking and aids in the development of proper texture and color properties in the cooked product.

In the preferred practice of this invention, the mold is employed in connection with apparatus which is capable of rapid internal cooking of the sausage mixture. Rapid internal cooking may be accomplished by holding the comminuted sausage mixture in the mold and bringing electrodes into contact with each end of the mixture, thus making the mixture part of an electric circuit. An electric current may then be passed through the mixture which represents a moderate electrical resistance in the circuit. The flow of current through this resistance results in the generation of internal heat sufficient to cook the unit mass of mixture. It is desirable that the electrical cooking means employed be associated with an integrator the function of which is to assure that a fixed amount of electrical energy will be passed through each unit mass of mixture regardless of any variation in the electrical resistivity of the mixture.

The cooking time generally is about one-third of a second, but this interval may vary, for example, up to one second, depending on the temperature of the mixture at the time of current flow, the size of the unit mass of sausage mixture, the salt content thereof, and the amount of electrical energy passed through the unit mass.

The temperature at which the meat mixture is cooked has a substantial effect on the surface properties of the final product. A cooking temperature that is too high will cause a separation of the fat particles from the meat mixture, resulting in a condition known as "rendering." If this occurs, the surface of the cooked sausage becomes pitted and excessively greasy, making further processing of the sausage commercially unfeasible. A cooking temperature that is too low, on the other hand, will result in a final product having an outer layer of uncoagulated meat proteins, poor overall texture and color characteristics.

We have found that an electrically generated temperature of from about 150° F. to about 212° F. and preferably from about 155° F. to about 180° F., produces a final product not only having the desired surface properties but also a texture and color comparable to high quality sausages produced by the slower conventional methods.

Since cooking takes place in a mold that is substantially moisture and air-impervious, the surface of the sausage, although cooked, remains in a moistened condition. By thus preventing dehydration of the surface of the cooked sausage, at no point does the surface adhere to the mold cavity wall. In this state, the surface of the cooked sausage is self-lubricating and thus may be easily ejected from the mold. Ejection may be accomplished by hand or by suitable mechanical means such as, for example, a plunger.

Following removal from the mold, the cooked sausage, in accordance with the preferred practice of this invention, is subjected to a current of heated air. Air heaters equipped with fans may be employed for this purpose. The temperature of the heated air may vary from about 120° F. to about 250° F. with a temperature range of from about 155° F. to about 175° F. being preferred. The heated air dehydrates the surface of the cooked sausage mixture, forming a crust or membrane thereon which is integral with the remainder of the sausage mixture. This crust has sufficient resiliency to retain the juices in the sausage mixture and to enable the cooked sausage to be handled, without further surface hardening treatment, in such post-forming operations as smoking, dyeing, if necessary, refrigeration and packaging.

To insure uniform and equal dehydration of the outer layer of the cooked sausage, we have found it highly advantageous to rotate the sausage while the current of heated air is performing its function. Rotation of the sausage may be accomplished by rolling the sausage down an inclined surface or, preferably, by placing the cooked sausage on a conveyor belt composed of a series of independently and uniformly rotating rollers. The inclined surface or the rollers may be heated to dehydrate the outer layer of the cooked sausage. Although this invention contemplates the use of such means in lieu of heated air to form a "skin" on the cooked sausage, the use of heated air is preferred.

The length of time that it takes to dehydrate the surface of the cooked sausage mixture and form the desired crust or membrane thereon varies from about three minutes to about thirty minutes. The time period necessary is, of course, dependent upon the speed at which the cooked sausage is rotated, its linear speed, air velocity and turbulence, and the temperature of the heated air.

If desired, the cooked sausage mixture may be subjected to a smoking operation concomitantly with the "skin" or membrane forming operation. This may be achieved by connecting the heated air ducts to a conventional smoke generating apparatus. Employing smoke at this point in the procedure has the effect of imparting desirable taste, color and bacteriostatic properties to the cooked sausage. It is also believed that certain chemicals carried by the smoke have an added effect upon the formation of the crust on the cooked sausage.

The crust, "skin," or membrane formed on the surface of the cooked sausage mixture in accordance with the practice of this invention has a smooth and wrinkle-free appearance. The crust, in addition, is of sufficient density to be able to hold the meat juices in the body of cooked sausage, and has enough resiliency to prevent easy breaking. Moreover, it has a blend of tenderness and firmness which makes it pleasing to the bite and chew of an individual eating it and, being composed of the same cooked meat as the remainder of the sausage, it is readily digestible.

In accordance with the teachings of this invention the term "sausage" is intended to mean all products comprising ground meat, such as beef, ham, veal, pork products, and in particular such items as frankfurters, bologna, luncheon loaf, and other well-known cooked sausage products.

Apparatus which may be employed in the practice of our invention is shown in the accompanying drawings, in which—

Figure 3:
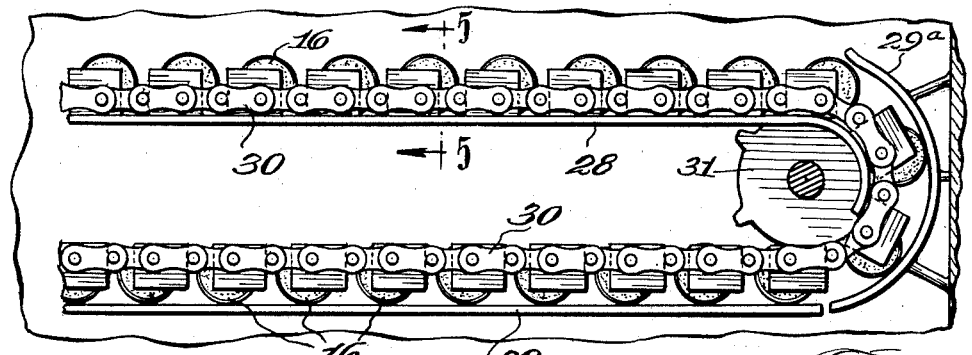
Figure 4:
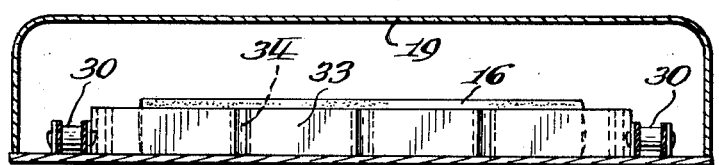

FIG. 1 is a diagrammatic showing, partly in section, of the apparatus; FIG. 2, a broken top plan view, on an enlarged scale, of conveyor mechanism for advancing and rolling the sausages; FIG. 3, a broken side view in elevation, on an enlarged scale, of the conveyor apparatus; FIG. 4, a transverse sectional view; FIG. 5, an enlarged broken detail sectional view, the section being taken as indicated at line 5—5 of FIG. 3; FIG. 6, an enlarged sectional detail view, the section being taken as indicated at line 6—6 of FIG. 2; FIG. 7, a transverse sectional view showing a modified form of pusher bar; FIG. 8, a broken side elevational view of a closed system stuffing mechanism for filling a mold; FIG. 8a, a broken sectional view of the mold apparatus at the cooking station where an electrical current is passed through the sausage meat; FIG. 8b, a view similar to FIG. 8a but showing another station at which the cylindrical sausage has been ejected; FIG. 9, a view similar to FIG. 8 but showing the apparatus in vertical section; and FIG. 10, a transverse sectional view, the section being taken as indicated at line 10—10 of FIG. 8.

In the schematic view shown in FIG. 1, 10 designates a container receiving the comminuted meat or emulsion from the emulsifier. From this source, the emulsion is passed to a vacuumizing unit 11 and from thence to a holding cooler 12. Chilling of the comminuted meat or emulsion prior to its storage within the holder 12 may occur either before or after the vacuumizing step. For example, if the emulsion is quickly chilled, as by the use of liquid $CO_2$ or Dry Ice, the vacuumizing step may take place after chilling and prior to holding in the cooler unit 12. On the other hand, if the emulsion is cooled in a heat exchange system, as by a votator, the emulsion may be vacuumized first and then chilled by the heat exchange system.

From the holder 12, the emulsion is passed to a closed system vacuum stuffer 13 in which the emulsion is subjected to vacuum in a closed system and under sufficient pressure to close the voids within the emulsion, and the emulsion then passed through the closed pipe 14 to the forming or cooking unit 15. The meat mixture or emulsion is stuffed into a mold within the unit 15. The unit 15 rotates one station and the sausage is subjected to an alternating electric current passing therethrough to coagulate the proteins of the mixture, and the formed sausage, indicated by the numeral 16, is ejected, after a rotation cycle of unit 15, upon a transfer conveyor 17. For the purpose of illustration, the cylindrical sausages 16 are shown on a greatly enlarged scale in proportion to the apparatus.

The cooked sausage is subjected to a water wash or shower at 18 for removing coagulation products (protein, fat, and water), and the washed sausages are passed into a post-forming unit indicated by the numeral 19. A conveyor is mounted in unit 19 and is indicated generally by the numeral 20. The post-forming unit has a plurality of compartments or stations. The first station, which is indicated by the numeral 21, is for the application of hot air and smoke for the skin-forming and smoking of the sausage; the next station, indicated by the numeral 22, is for the application of dye or hot wash water; the third station, which is indicated by the numeral 23, is for drying the sausage; and the fourth station, indicated by the numeral 24, is a chilling section. From the chilling section, the sausages are delivered upon a transfer conveyor 25 to conveyor 26 and thence to packaging unit 27. Hot air and smoke may be introduced into compartment 21 through the conduit 21a and withdrawn through conduit 21b. Dye or hot water may be showered upon the sausages through the head 22a and the dye collected in a container 22b for return by pump (not shown) to the head 22a. Any suitable means for the introduction of the smoking, dyeing, drying, and chilling mediums may be employed.

The post-forming conveyor 20 comprises an upper plate 28 on which the sausages are rolled, and a lower plate 29 on which the sausages are also rolled. A roller chain conveyor 30 extends around sprocket wheels 31 and 32, one of which is driven, and the roller chain carries transverse flights or pusher bars 33 which preferably have forwardly-pressed ribs 34 for engaging the cylindrical sausage 16 at spaced distances. The bars also have end flanges 35 which keep the sausages in alignment. As shown in FIG. 3, there is a removable curved plate 29a for guiding the sausages from the upper plate 28 downwardly onto the lower plate portion 29.

A modified form of pusher bar is shown in FIG. 7. In this structure, the bar is formed of wire having a U-shaped wire portion 36 with depending fingers 37.

The closed system vacuum stuffer is described best in FIGS. 8 to 10 inclusive. In this structure, there is provided a hopper 38 in which the emulsion or comminuted meat 39 is placed, the meat forming a seal across the upper portion of the hopper. The lower portion of the hopper communicates with a screw propeller passage 40 in which are mounted parallel screws 41 and 42. The screws advance the meat into the conduit 14 which leads to the cooking or forming unit 15. Communicating with the screw conveyor passage 40 is a vacuum passage 43 which, as shown best in FIG. 10, has the end portions thereof in communication with downwardly-extending vacuum pipes 44 leading to a vacuum chamber 45. The chamber 45 is maintained under vacuum by a vacuum pump (not shown).

Mounted within the hopper 38 is a propeller member 46 which is rotated to force the emulsion downwardly into the screw propeller passage 40.

In the operation of the apparatus shown in FIGS. 8 to 10 inclusive, the emulsion stuffer system is maintained as a closed system, the emulsion 39 in the hopper serving as a seal. The emulsion as it is worked in the lower portion of the hopper and in the screw conveyor chamber is subjected to vacuum so that air is removed from the emulsion or meat mixture, while at the same time the pressure generated by the conveyor system closes the voids in the mixture, with the result that the mixture is delivered to the sausage-forming or cooking unit 15 and to the mold 47 thereof substantially free of air and voids. The mold is provided with an electrode 48 on one side thereof, and when the unit 15 is indexed to another station, the electrode 49 is brought into alignment with the electrode 48 and electric current passed through the sausage to coagulate the proteins thereof. At the station shown in FIG. 8b, the sausage indicated by the numeral 16 has been ejected upon the transfer conveyor 17 and lies upon the conveyor in true cylindrical form. Since the apparatus 15 is well known, a detailed description herein is believed unnecessary. It is sufficient to say that the sausage mixture is fed into the molds of the unit and the unit rotates through a series of stations in which the sausage is cooked, ejected, and the mold washed, etc.

As already stated, air pockets or voids within the sausage produce unsatisfactory results, causing uneven cooking, non-uniform weights, possible arcing, etc., and by providing a closed system in which the voids are eliminated and there removed, it is now possible to obtain highly uniformly-cooked sausages. By providing for the agitating or working of the mixture simultaneously with the vacuumizing within the closed system, it is found that the voids as they develop as a result of the removal of air are quickly closed, and the substantially solid or compact emulsion advanced to the filling station at unit 15, the reentrance of air being excluded.

The foregoing detailed description has been given for purposes of explanation only and it is expected that changes may be made in the details of procedures without departing from the spirit of this invention.

We claim:

1. In a process for preparing sausages in which a comminuted meat mixture is pressed into a rigid mold and an electric current is passed therethrough to coagulate meat proteins, the steps of moving said meat under pressure in a closed system to said mold while subjecting said meat in said closed system to vacuum whereby air is removed from said meat and voids therein are closed before said meat enters said mold.

2. In a method for preparing sausages in which a comminuted meat mixture is encased in a rigid mold and an electric current is passed through to coagulate the proteins, the steps of subjecting said comminuted meat to vacuum and mechanical pressure for working the meat mixture in a closed system to eliminate air and voids therein, and delivering said meat mixture substantially free of air and voids to said mold.

3. In a process for preparing sausage by stuffing comminuted meat into a mold and passing an electric current through the mold, the steps of providing a closed stuffing system for comminuted meat, sealing said closed system with said comminuted meat, subjecting said comminuted meat to a vacuum while working and propelling said meat to said mold, whereby said meat is delivered to said mold substantially free of air and voids.

References Cited in the file of this patent
UNITED STATES PATENTS

| | | |
|---|---|---|
| 2,043,132 | Vogt | June 2, 1936 |
| 2,060,902 | Jackson | Nov. 17, 1936 |
| 2,690,970 | Moses | Oct. 5, 1954 |
| 2,788,735 | Farace | Apr. 16, 1957 |
| 2,792,306 | Harper | May 14, 1957 |
| 2,805,444 | Hensgen et al. | Sept. 10, 1957 |
| 2,877,118 | Hensgen et al. | Mar. 10, 1959 |
| 2,897,745 | Nickols et al. | Aug. 4, 1959 |
| 2,965,491 | Clemens et al. | Dec. 20, 1960 |
| 2,995,449 | Allen et al. | Aug. 8, 1961 |
| 3,068,104 | Gretler et al. | Dec. 11, 1962 |